United States Patent Office 2,912,913
Patented Nov. 17, 1959

2,912,913

SHUTTER AND DIAPHRAGM ADJUSTING MECHANISM FOR PHOTOGRAPHIC CAMERAS

Hermann Bretthauer and Hermann Friedrich Albrecht, Braunschweig, Germany, assignors to Franke & Heidecke Fabrik Photographischer Prazisions-Apparate, Braunschweig, Germany, a firm of Germany Application January 18, 1954, Serial No. 404,522

Claims priority, application Germany January 19, 1953

9 Claims. (Cl. 95—64)

The present invention relates to photographic cameras, and more particularly to the adjustment of the shutter speed and the diaphragm opening or aperture in photographic cameras of the type having a mirror reflex focusing and view finding chamber such as, but not limited to, the twin lens reflex cameras currently available on the market under the trademark "Rolleiflex."

An object of the invention is to provide simple and satisfactory mechanism, capable of easy and quick operation, for simultaneously adjusting the shutter speed and the diaphragm aperture or stop, in an opposite or complementary way, so that as the shutter speed is made faster (that is, making an exposure of shorter duration) the diaphragm aperture or stop is simultaneously opened wider to an extent sufficient to compensate for the faster shutter speed, and vice versa.

Another object of the invention is the provision of simple and satisfactory mechanism, easily and quickly operable, for adjusting the shutter speed and the diaphragm aperture relative to each other in a non-complementary manner, when desired, to vary the relationship between these two factors in accordance with varying conditions of illumination or other variables or exposure values, and also for varying or adjusting the two factors of diaphragm aperture and shutter speed in a complementary manner relative to each other, when desired, without affecting the exposure value.

A further object is the provision of adjusting mechanism of the kind above mentioned, particularly designed and adapted for use with a camera of the kind having a mirror reflex focusing and view finding chamber and especially such a camera of the twin lens reflex type.

A still further object is the provision of such adjusting mechanism so designed and constructed as to be operated by manual operating members closely similar to those heretofore used on one common type of twin lens reflex camera, and so designed and constructed that the visual indications are seen from above through an observation window in the same location as in the commonly used twin lens reflex camera just mentioned, in order that the operator may operate the new camera equipped with the present invention in a manner closely similar to the operations to which he is already accustomed in previous twin lens reflex cameras of the same general kind.

These and other desirable objects may be attained in the manner disclosed as an illustrative embodiment of the invention in the following description and in the accompanying drawings forming a part hereof, in which.

Figure 1:
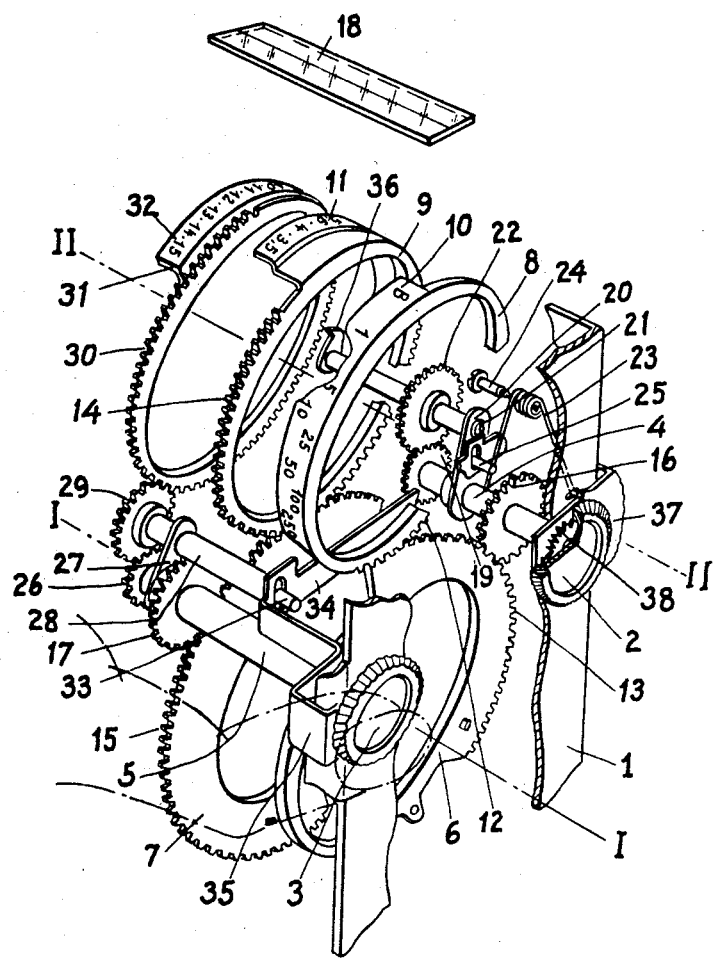
Fig. 1 is a skeletonized or diagrammatic perspective view of the operating or adjusting mechanism in accordance with one embodiment of the present invention, with conventional parts of the camera construction broken away or entirely omitted for the sake of clarity.

As already indicated, the present invention is intended especially for use with a photographic camera having a mirror reflex focusing and view finding chamber, the problems in connection with adjustment of shutter speed and diaphragm aperture in such cameras being somewhat different than with other types of cameras. The operator customarily holds a camera of this kind at chest level or waist level, and looks downwardly toward the viewing screen of the focusing and view-finding chamber when preparing to take the picture. In certain types of such cameras, the adjusting scales for the shutter speed and the diaphragm aperture or stop are visible through an observation window which faces upwardly near the front of the camera, so that the operator can see the indications visible through this window while looking downwardly toward the focusing screen, and the shutter speed and diaphragm adjustments are also made by finger-operated knobs accessible at the front of the camera. Hence one of the problems encountered in devising new adjusting mechanism for simultaneously adjusting the aperture and the shutter speed in a complementary manner, and also for adjusting them in a non-complementary manner, is to make the new adjusting mechanism in such form that the adjusting scales or indications will still be visible through an observation window located approximately in the same position as formerly, and so that the adjustments may still be accomplished by finger manipulation of adjusting knobs located in approximately the same position as formerly, in order that the operator, when using the new mechanism, may follow approximately the same pattern of convenient and easy operation to which he has already become accustomed in operating previous forms or models of cameras of the same general type.

While the present invention may be applied to various forms of twin lens reflex cameras, it is here disclosed by way of example as applied to a twin lens reflex camera of the kind identified by the trademark "Rolleiflex," manufactured by the firm of Franke & Heidecke, of Braunschweig, Germany, and widely known and used throughout the United States. Different models of this well known camera have varied in detail from time to time, but the basic construction, at least of those parts with which the present invention is concerned, has remained essentially the same for several years past. The following disclosure of the invention presupposes familiarity with the main constructional features of the "Rolleiflex" camera. For those not already familiar with the construction of this camera, reference may be made to the book "Rollei Photography, Handbook of the Rolleiflex and Rolleicord Cameras" by Jacob Deschin, published in 1952, by Camera Craft Publishing Company, of San Francisco, California. Many of the constructional features of the camera are also disclosed in the pamphlet "Rolleiflex 2.8C in Practical Use," published in 1953 by the manufacturer, the above mentioned firm of Franke & Heidecke.

As will be readily understood by those familiar with the "Rolleiflex," this camera comprises two lenses, a lower or picture-taking lens with which a shutter is associated, and an upper or finder lens having no shutter. The shutter may be of any convenient form, such as the shutter marketed under the trademark "Compur," manufactured by the firm of Friedrich Deckel, of Munich, Germany. The principal features of such a shutter are disclosed in United States Patent 1,687,123, granted October 9, 1928, for an invention of Deckel and Geiger. This shutter has, as usual, an adjustable iris diaphragm or stop adjusted by movement of the built-in adjusting member in a direction circumferentially or peripherally of the shutter casing, the diaphragm preferably being modified from conventional practice in such a way that equal angular movements of the adjusting member will produce equal proportionate changes in the aperture area. This may be accomplished, for example, as taught in U.S. Patent 871,654, granted November 9, 1907, on an application of Watkins and Woodhead, or in British Patent 464,892, accepted April 27, 1937, on an application of Zeiss Ikon A.G. The timing adjustment or speed adjustment of the shutter (controlled by the speed adjusting ring 63 in said Deckel and Geiger patent) is also preferably constructed in such manner (by properly constructing the shape of the control cam on this ring 63) that equal angular movements of the speed adjusting ring will produce equal proportionate changes in the time or duration of exposure.

Referring now to the first embodiment of the present invention, as illustrated in Fig. 1 of the drawings, the optical axis of the picture taking lens and of its associated shutter is indicated by the broken line I—I, while the optical axis of the finder lens, located above and parallel to the optical axis of the taking lens, is indicated by the broken line II—II. The lenses themselves, as well as the shutter, are omitted from Fig. 1 for the sake of clarity. A fragment of the camera front structure is illustrated at 1, this camera front structure carrying the two lenses and the shutter and being movable forwardly and backwardly (longitudinally of the two optical axes I—I and II—II) for purposes of focusing, by means of the usual focusing knob on the camera body.

Also mounted on the camera front structure 1, in positions accessible for operation by the fingers of the operator, are the two adjusting knobs 2 and 3, shaped similarly to and occupying the same positions as the customary adjusting knobs already familiar in "Rolleiflex" camers. However, in the "Rolleiflex" camera as heretofore constructed, the left hand knob occupying the position of the knob 2 in the present drawings, serves to control the stop or diaphragm aperture, while the right hand knob occupying the position of the knob 3 in the present drawings serves to control the shutter speed. (The terms "right" and "left" as here used refer to the respective right and left sides of the camera as normally held in front of the chest or waist of the operator, with the lenses pointing forwardly. Hence these terms are reversed with reference to the appearance of the present drawings, which view the camera obliquely from the front.) In the present instance, however, the knobs 2 and 3, although of the same shape and in the same locations as the speed and diaphragm adjusting knobs in the conventional "Rolleiflex" camera, serve different functions, as explained below.

The auxiliary or supplementary shutter speed adjusting ring 6 and the auxiliary or supplementary diaphragm aperture adjusting ring 7 both rotate on the shutter casing about the optical axis I—I as a center or axis, and the ring 6 is coupled in the usual manner to the built-in speed setting or time setting ring of the shutter (such as the ring 63 in said Deckel and Geiger patent) while the diaphragm ring 7 is likewise coupled in the usual manner to the aperture adjusting member of the shutter (shown but not specifically described or numbered in said Deckel and Geiger patent). The speed adjusting member 6 is provided with peripheral gear teeth 13 which engage with peripheral gear teeth 12 on a drum or ring 8 which rotates about the upper lens axis II—II as a center, and which has a flange provided with a graduated scale 10 marked with the various shutter speeds. The diaphragm adjusting ring 7 is also provided with peripheral gear teeth 15 which mesh with peripheral teeth 14 on the ring or drum 9 which, like the ring 8, rotates about the upper optical axis II—II as a center. This ring 9 has a flange provided with graduations or markings 11 showing the value of the aperture or stop for which the shutter diaphragm is set at any particular time, the scale 11 usually being graduated in terms of $f$ number. The shutter speed or exposure scale graduations 10 and the diaphragm scale graduations 11 are both visible, when looking downwardly from above, through a sight window indicated diagrammatically at 18, and corresponding in location to the speed and aperture sight window which is familiar and customary in "Rolleiflex" cameras.

These rings 6, 7, 8, and 9, together with the scales 10 and 11 and the sight window 18, are substantially the same as in the "Rolleiflex" cameras already in use, and perform the same functions of adjusting and indicating the adjustment of the shutter speed and the diaphragm aperture, so they need not be further described.

According to the present invention, the finger knob 2 is fixed to the front end of a shaft 4 which is journaled in suitable stationary bearings supported from the camera front member 1, and which carries a pinion 16 fixed to the shaft 4 and meshing with the peripheral teeth 13 on the ring 6. By turning the knob 2 by finger pressure the ring 6 may be turned to vary the shutter speed, and it likewise turns the ring 8 to bring the appropriate part of the scale 10 beneath the observation window 18, to show the operator the particular shutter speed which has been set. The shaft 4 also has fixed to its rear end another pinion 19 meshing with a pinion 22 rotatable on a stub shaft 21 carried by a radial arm 20 which is loosely swingable on the shaft 4 as a center. A hairpin spring 23 wound on a stationary stud 24 normally presses laterally against a pin 25 fixed to the arm 20, tending to move the upper end of the arm 20 toward the right side of the camera (leftwardly when viewed as in Fig. 1) to hold the pinion 22 in meshing engagement with the peripheral gear teeth 14 on the ring 9.

The other finger knob 3 is fixed to the front end of a shaft 5 which is likewise journaled in stationary bearings carried by or supported from the camera front member 1. The shaft 5 has a pinion 17 fixed to the shaft and constantly in meshing engagement with the peripheral teeth 15 on the diaphragm adjusting member 7. Another pinion 26 is fixed to the shaft 5 at its rear end, and the shaft also carries an arm 27 loosely rotatable on the shaft and serving as a support for a stub shaft or pivot 28 arranged parallel to the shaft 5, which shaft 28 supports a rotatable gear or pinion 29 constantly in mesh with the pinion 26 on the shaft 5, and capable of being brought into mesh also with peripheral gear teeth 30 on a ring or drum 31 which, like the rings 8 and 9, is rotatable about the upper optical axis II—II as a center and which carries graduations 32 which are visible through the same sight window 18 which is used in observing the graduations 10 and 11. The graduations 32 are preferably graduated in terms of what may be called a total exposure value or integrated exposure value, representing the integrated result of exposure requirements when taking into account the film speed or sensitivity, and the particular light or illumination conditions, modified by filter factor, if any, and thus representing a particular series of mutually dependent or complementary relationships between shutter speed and diaphragm aperture, but independent of absolute values of either shutter speed or diaphragm aperture.

When the upper end of the arm 27 is swung toward the left side of the camera (that is, rightwardly when viewed as in Fig. 1) the pinion 29 is brought into mesh with the gear teeth 30, so that any rotation of the finger knob 3 will be transmitted, through the pinion 17, to the diaphragm adjusting ring 7, and also through the pinions 26 and 29 to the integrated exposure value scale member 31. But if the upper end of the arm 27 is swung toward the right side of the camera (leftwardly when viewed as in Fig. 1) then the pinion 29 will be disconnected from the gear teeth 30, and rotation of the finger knob 3 will turn the diaphragm adjusting member 7 without affecting the integrated exposure value scale member 31.

The invention also includes means for shifting the two arms 20 and 27 concomitantly. This means includes a cross slide 34 having a slot for receiving the pin 25 on the arm 20 and also another slot for receiving the pin 33 on the stub shaft 28 of the arm 27. The right hand end of the cross slide 34 (that is, the left end when viewed as in Fig. 1) is bent forwardly and extends out through a slot near the left side of the camera front structure 1 to an accessible finger piece 35 located near the finger knob 3. The spring 23, normally pressing rightwardly on the pin 25, tends to hold the pinion 22 in mesh with the gear teeth 14 on the ring 9, and to hold the pinion 29 out of mesh with the gear teeth 30 on the ring 31. But by pressing leftwardly on the finger piece 35, against the force of the spring 23, the arms 20 and 27 are swung on their respective shafts 4 and 5 so as to bring the pinion 22 out of mesh with the teeth 14 and to bring the pinion 29 into mesh with the teeth 30. The left end (right hand end when viewed as in Fig. 1) of the slide 34 is also bent forwardly and extends out through a slot in the camera front member 1 and around the side of the front member and then extends at 37 behind the finger knob 2, and has a tooth 37a arranged to engage with one or another of ratchet teeth 38 secured on the shaft 4 behind the knob 2, to lock this shaft against turning when the slide 34 is moved leftwardly against the force of the spring 23. The stub shaft 21 carries another locking tooth 36 which engages the teeth 30 and holds the member 31 against rotation whenever the arms 20 and 27 and the slide 34 are shifted to their rightward limit of motion under the influence of the spring 23.

The operation of this form of the invention is as follows: When preparing to take a picture, the operator first determines the correct total exposure value or integrated exposure value, as for example by reference to a photoelectric light meter and by taking into account the film speed or sensitivity and the proper filter factor, if any filter is to be used, or by reference to an exposure table or guide which is marked in terms of integrated exposure value rather than in the conventional terms of shutter speed and aperture. Then the finger piece 35 at the forward right corner of the camera front structure 1 is pressed leftwardly to shift the slide 34 leftwardly against the force of the spring 23, thereby engaging the gear 29 with the gear teeth 30 on the integrated exposure scale member 31, and disengaging the gear 22 from the gear teeth 14 on the ring 9 and the locking tooth 36 from the teeth 30. At the same time, the tooth 37a enters the ratchet 38 to lock the knob 2 against rotation. While holding the leftward pressure on the finger piece 35, the operator turns the knob 3 to turn the exposure value ring 31 until the appropriate graduation 32 is seen through the sight window 18. This turning of the exposure value scale is accompanied by turning of the diaphragm aperture adjusting member 7 and corresponding turning of the aperture scale 11, but any accidental turning of the speed adjustment member 6 is prevented at this time by the tooth 37a. When the scale 32 has been adjusted for the proper integrated exposure value, the pressure on the finger piece 35 is released, so that the force of the spring 23 shifts the slide 34 rightwardly to its normal position, disengaging the pinion 29 from the teeth 30 on the exposure value drum and engaging the pinion 22 with the teeth 14 on the diaphragm scale drum 9, at the same time moving the locking tooth 36 into engagement with the teeth 30 to hold the exposure value ring 31 stationary and prevent any accidental rotation thereof.

The operator may now turn the other finger knob 2 to adjust simultaneously, but in a complementary manner, both the shutter speed and the diaphragm aperture, to any desired setting of either one of these factors, the other one being automatically adjusted at the same time to the proper value in view of the previous setting of the integrated exposure scale 32. By turning the finger knob 2 in one direction, the shutter speed is increased (with decrease of duration of exposure) by action of the pinion 16 on the gear teeth 13, while at the same time the diaphragm aperture is increased to compensate for the increased shutter speed, by action of the pinions 19 and 22, since the latter meshes with the gear teeth 14 on the ring 9, which in turn meshes with the gear teeth 15 on the diaphragm adjusting member 7. If the finger knob 2 is turned in the opposite direction, the shutter speed is decreased and the diaphragm aperture is closed down or made smaller to compensate for the slower speed or longer duration of exposure.

These various adjustments are accomplished easily and quickly, and by manipulation of knobs in locations already familiar to the operator of cameras of this general type, the results being observed through the window 18 in a location already familiar to the operator. Hence the operator has a minimum of new manipulations to learn, with a maximum of old operating habits and techniques still to be followed. Thus the advantages of using an integrated exposure value scale may be obtained without requiring any radical departure from the operating techniques already familiar to users of "Rolleiflex" cameras.

Figure 2:
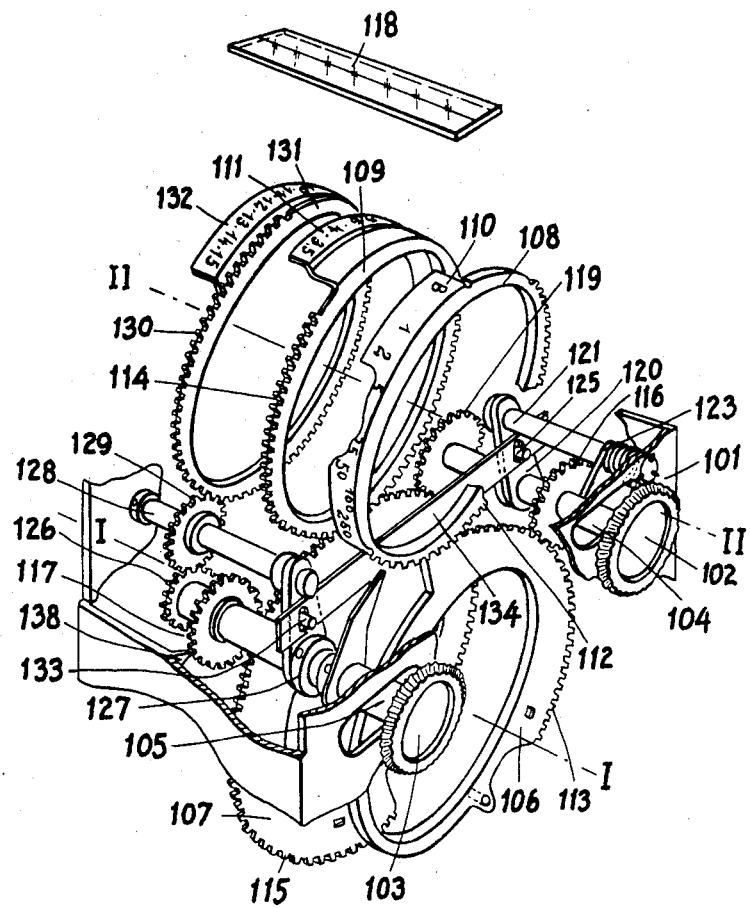
Fig. 2 is a similar view of a second embodiment of the present invention.

A second embodiment of the invention is illustrated in Fig. 2 of the drawings. Except for the changes mentioned below, this second embodiment is the same as the first embodiment, and corresponding parts bear the same reference numerals increased by 100. Thus the shutter adjusting ring 6 and the diaphragm adjusting ring 7 of the first embodiment respectively become 106 and 107 in the second embodiment, and other parts similarly. Those parts which are not changed need not be further described in detail.

In this second embodiment, the shafts 104 and 105 of the setting knobs 102 and 103, respectively, are not mounted in fixed bearings but are mounted so as to be able to move laterally relative to the camera front structure 101, and they extend out through slots in the front of the camera. A fixed pin 121 supported from the camera front structure 101 carries a crank arm 120 oscillatable on the pin, and in this crank arm is a bearing or journal in which the shaft 104 rotates, so that by swinging the crank arm on its support 121, the entire shaft 104 may be bodily shifted laterally to right or left. A hairpin spring 123 wound around the pin 121 and having one end pressing against the shaft 104, constantly tends to move the shaft to the rightward limit of its travel (leftward when viewed as Fig. 2) in which the pinion 116 fixed to the shaft 104 meshes with the teeth 113 on the speed setting ring 106, while at the same time the pinion 119 fixed to the rear end of the shaft 104 meshes with the teeth 115 on the diaphragm setting ring 107. But if sufficient leftward force is applied to the shaft 104 to move it leftwardly relative to the camera body (rightwardly when viewed as in Fig. 2) against the force of the spring 123, both of the pinions 116 and 119 will be carried out of meshing engagement with the respective gear teeth 113 and 115.

The other setting knob shaft 105 is similarly journaled in a bearing in the crank arm 127 which is oscillatable on the fixed pin 128 mounted on the camera front structure 101, so that this shaft 105 may likewise move bodily rightwardly and leftwardly. The lateral movements of the two shafts 104 and 105 are coupled to each other by means of a cross slide 134 having slots which engage pins 125 and 133 on the respective crank arms 120 and 127.

Fixed to the shaft 105 are two pinions, 117 and 126. The former is in mesh with the gear teeth 115 of the diaphragm setting ring 107 when the shaft 105 is at the leftward limit of its lateral travel (rightward when viewed as in Fig. 2) and out of mesh therewith when the shaft is at the rightward limit of its travel. The other pinion 126 is constantly in mesh with a pinion 129 rotatable on the fixed pin 128, which pinion in turn is constantly in mesh with the gear teeth 130 on the exposure value drum 131 which carries the total exposure value or integrated exposure value scale 132. When the two crank arms 120 and 127 are oscillated to carry the shafts 104 and 105 bodily rightwardly relative to the camera (leftwardly when viewed as in Fig. 2) to the limit of motion, a fixed locking tooth 138 engages with the pinion 117 to prevent turning of the shaft 105. When the crank arms are oscillated in the opposite direction to carry the shafts 104 and 105 to their leftward limit of motion, a locking tooth 137a controlled by the shaft 105 swings into engagement with the gear teeth 112 on the shutter speed scale drum 108, thereby locking this drum (and also the speed setting ring 106 meshing therewith) against turning movement.

The operation of this embodiment of the invention is as follows: The shafts 104 and 105 to which the setting knobs 102 and 103 are fixed, are normally kept at the rightward limit of their lateral travel by the spring 123, so that the pinions 116 and 119 are normally meshed with the gear teeth 113 and 115, and the pinion 117 is normally out of mesh with the gear teeth 115 and is locked against rotation by the locking tooth 138. Now if the operator, preparatory to taking a picture, has ascertained by a photoelectric exposure meter or otherwise, that the total exposure value or integrated exposure value, considering film speed and illumination conditions and filter factor, is different from the total exposure value or integrated exposure value for which the parts are already set (visible by observing the graduations 132 through the window 118) he moves the knob 103 leftwardly (to the right when viewed in Fig. 2) by leftward finger pressure thereon, so as to overcome the force of the spring 123 and to bring the pinion 117 into mesh with the gear 115, which movement at the same time (through the cross slide 134) will carry the pinions 116 and 119 out of mesh with their mating gears and will lock the parts 106 and 108 against rotation by means of the locking tooth 137a. Then, while maintaining the leftward pressure on the knob 103, the operator turns this knob in one direction or the other as required, so that the pinions 126 and 129 turn the exposure value drum 131 to bring the desired scale graduation 132 beneath the observation window 118. At the same time, the pinion 117 turns the diaphragm adjusting ring 115 to increase or decrease the diaphragm aperture, as the case may be, in accordance with the change in setting of the integrated exposure value scale, and the setting of the diaphragm aperture from time to time is indicated by the scale 111 visible through the window 118.

Having set the parts to the desired integrated exposure value, the operator releases the pressure on the setting knob 103, and the spring 123 then carries the parts rightwardly relative ot the camera body, to their initial position, whereupon the knob 103 and shaft 105 are locked against further rotation by means of the locking tooth 138. The pinions 116 and 119 are now in engagement with the gear teeth 113 and 115, and the shaft 104 and its setting knob 102 may be rotated as desired, to bring the diaphragm aperture to any desired value, automatically making complementary change in the shutter speed, or to bring the shutter speed (indicated by the scale 110 visible through the window 118) to any desired value, meanwhile automatically making corresponding complementary change in the diaphragm aperture. Thus once the total exposure value scale has been set to a value dependent upon the film speed and light conditions and the filter factor, the rest of the setting (of either the shutter speed or the diaphragm aperture) is accomplished in a complementary manner, automatically opening the diaphragm aperture to a larger area when setting for a shorter time of exposure, or automatically changing the shutter speed to a shorter time of exposure when the diaphragm aperture is increased, and vice versa. The operator may therefore approach the final setting either from the standpoint of setting the parts to a particular shutter speed that he wants, letting the diaphragm aperture take care of itself automatically, or from the standpoint of setting for a particular aperture that he wants, letting the shutter speed take care of itself automatically.

Figure 3:
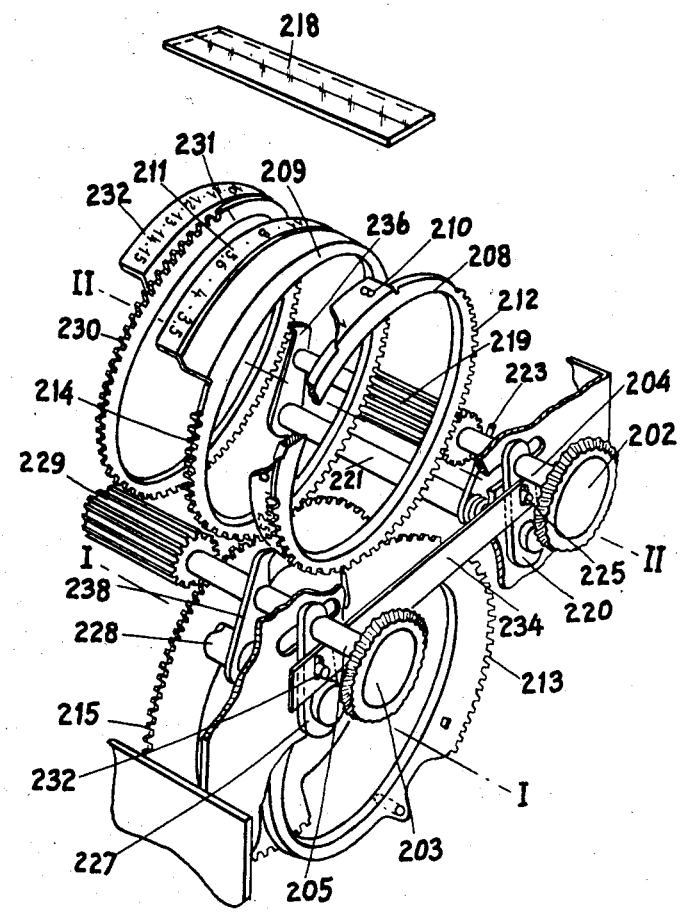
Fig. 3 is a similar view of a third embodiment of the present invention.

A third embodiment of the invention is shown in Fig. 3. Except for the differences noted below, this third embodiment is basically similar to the second embodiment shown in Fig. 2, and for corresponding parts the same reference numerals have been used, increased by 100 over the numerals used in Fig. 2 and increased by 200 over the numerals used in Fig. 1. Thus the speed setting ring and the diaphragm aperture setting ring indicated respectively at 6 and 7 in Fig. 1, and at 106 and 107 in Fig. 2, are indicated at 206 and 207 in Fig. 3. The parts which are not modified as compared with Fig. 2 need not be further described, reliance being placed upon the reference numerals in Fig. 3 to indicate similar parts performing similar functions as compared with Fig. 2, except as specifically noted below.

The shaft 204 carrying the adjusting knob 202 is journaled in a bearing on the arm 220 which swings on the fixed shaft or pin 221. As in the previous embodiment, the shaft extends through a slot in the camera front structure 201 so as to be capable of moving laterally. The spring 223 normally tends to move the shaft 204 rightwardly relative to the camera (leftwardly when viewed as in Fig. 2) until a long pinion 219 fixed to the shaft 204 engages both with the gear teeth 212 on the shutter speed indicating drum 208 and with the gear 214 on the diaphragm aperture indicating drum 209. A locking tooth 236, rotatably mounted on the fixed pin 221 and connected to the shaft 204 to swing with the shaft, engages and locks the gear teeth 230 on the exposure value indicating drum 231 when the shaft 204 is in its normal or rightward position.

The shaft 205 of the other setting knob 203 is similarly journaled in an arm 227 which swings on the fixed pin 228 and is coupled by means of the cross slide 234 and the pins 225 and 233 to the arm 220, so that both shafts 204 and 205 move laterally rightwardly or leftwardly together. The shaft 205 has fixed to it a long pinion 229 which meshes both with the gear teeth 214 on the diaphragm aperture indicating drum 209 and with the gear teeth 230 on the exposure value indicating drum 231, when the shaft 205 is at the leftward limit of its motion, and which is out of engagement with both of these gears when the shaft 205 is in its normal rightward position. When in its leftward position, the shaft 205 carries with it a locking tooth 238 pivoted on the pin 228 and engaging the gear teeth 212 of the speed indicating drum 208.

The operation is similar to that already described with reference to Fig. 2. To adjust the parts to any selected setting of the integrated exposure value, the setting knob 203 is pressed leftwardly relative to the camera body (rightwardly when viewed as in Fig. 3) to overcome the force of the spring 223 and to carry the pinion 219 and locking tooth 236 out of engagement with the respective gears 212, 214, and 230, while carrying the pinion 229 into engagement with the gears 214 and 230, and to carry the locking tooth 238 into engagement with the gear teeth 212. The knob 203 may now be turned to set the exposure value drum 231 so that any desired graduation 232 thereof may be read through the window 218. Then when the lateral pressure on the knob 203 is released, the spring 223 brings the parts rightwardly again relative to the camera body, whereupon the knob 202 may be turned to adjust the shutter speed and the diaphragm aperture in a complementary manner, automatically adjusting the diaphragm aperture to agree with any selected shutter speed, or automatically adjusting the shutter speed to agree with any selected diaphragm aperture.

Both in this embodiment and in the two previous embodiments, it is entirely possible, however, to approach the setting directly from the standpoint of shutter speed rather than integrated exposure value, if the operator desires to disregard integrated exposure value and set the shutter speed in accordance with a conventional light meter or exposure table. Thus the operator may first turn the setting knob 202 to set the shutter speed to any desired value indicated by the graduations 210 visible through the observation window 218. Of course this will at the same time turn the diaphragm setting mechanism, but that can be disregarded for the moment. Then the operator can turn the knob 203 (pressing the same leftwardly relative to the camera body) to set the diaphragm aperture at any selected value as determined by the scale 211 read through the observation window 218. This will at the same time turn the integrated exposure value scale 232, but the same can be disregarded if the operator is not using this scale in setting the camera, but is setting the exposure conditions by direct reference to the shutter speed and the diaphragm aperture.

In all three of the embodiments above described, the various gears which are capable of being shifted from meshing to unmeshing position constitute in effect, disengageable driving means.

In all of these various embodiments of the invention, it is seen that the adjusting knob 2 or 102 or 202 may be used to adjust both shutter speed and diaphragm aperture in a manner complementary to each other, while maintaining the same integrated exposure value or total exposure value. Likewise, in all embodiments, the other adjusting knobs 3 or 103 or 203 may be used to change one of the two factors of speed and aperture relative to the other, in a non-complementary manner, on account of variations in illuminating conditions, filter factor, or film speed. In the specific forms shown, it is the diaphragm aperture which is changed directly by the knob 3 or 103 or 203 but obviously the functions of the rings 6 and 7 could be reversed if desired, and the ring 7, 107, etc., could be made to control shutter speed while the ring 6, 106, etc., would control aperture, with corresponding changes in the graduated scales on the drums 8 and 9, 108 and 109, etc. Also, in the form shown in Fig. 1, the knob 3 can be used to effect complementary adjustment of aperture and shutter speed, if this knob is turned without pressing the finger piece 5, for under these conditions the knob 3 will turn the ring 7 without turning the scale member 31, and the turning of the ring 7 will be transmitted through the gears 14, 22, 19, and 16 to the ring 6.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. Photographic shutter adjusting mechanism comprising a shutter speed scale ring, a diaphragm aperture scale ring, and an exposure value scale ring all mounted coaxially for rotary movement about a common axis, a first adjusting knob mounted on and turning with a first shaft parallel to said axis, a second adjusting knob mounted on and turning with a second shaft also parallel to said axis and parallel to said first shaft, first disengageable gear means operatively coupling said first knob and shaft in roatry driving relationship to both of said two first-mentioned scale rings to turn both of them simultaneously by rotation of said first knob, second disengageable gear means operatively coupling said second knob and shaft in rotary driving relationship to said exposure value scale ring and to one only of said two first-mentioned scale rings, means interconnecting said two disengageable gear means to each other for disengaging each of said gear means at least partly when the other of said gear means is in effective coupling position, and resilient means tending to maintain said first gear means in effective coupling position and said second gear means in ineffective position.

2. A construction as defined in claim 1, further including means operated by movement of said interconnecting means for locking one of the three scale rings against turning when one of the disengageable gear means is operatively engaged with the other two rings.

3. Photographic shutter adjusting mechanism comprising a shutter speed scale ring operatively connected to shutter speed adjusting mechanism, a diaphragm aperture scale ring operatively connected to diaphragm adjusting mechanism, and an exposure value scale ring all mounted coaxially for rotary movement about a common axis, a first adjusting knob mounted for rotation and accessible for manual actuation, a second adjusting knob also mounted for rotation and accessible for manual actuation, means permanently coupling said first knob in driving relation to said speed scale ring, means permanently coupling said second knob in driving relation to said aperture scale ring, a first engageable and disengageable drive means for operatively coupling said first knob in driving relation to said aperture scale ring, a second engageable and disengageable drive means for operatively coupling said second knob in driving relation to said exposure value scale ring, and interconnecting means for disengaging said first drive means when said second drive means is engaged and vice versa.

4. A construction as defined in claim 3, further including a spring tending to keep said first drive means engaged and said second drive means disengaged.

5. A construction as defined in claim 3, further including a locking means operated by movement of said interconnecting means for locking said speed scale ring against rotation when said first drive means is disengaged and said second drive means is engaged.

6. A construction as defined in claim 3, further including locking means operated by movement of said interconnecting means for locking said exposure value ring against rotation when said first drive means is engaged and said second drive means is disengaged.

7. A construction as defined in claim 1 in which both of said shafts are mounted for bodily displacement laterally of their axes, and in which said first disengageable gear means includes gear means on said first shaft for establishing driving connection with said speed scale ring and said aperture scale ring when said first shaft is in one position and for disengaging such connection when said first shaft is displaced laterally to a different position, and in which said second disengageable gear means includes gear means on said second shaft for establishing driving connection with said aperture scale ring and said exposure value scale ring when said second shaft is in one position and for disengaging the connection at least with said aperture scale ring when said second shaft is displaced laterally to a different position, and in which said interconnecting means includes linkage means operatively connecting said two shafts to each other for conjoint lateral displacement to move either shaft laterally into gear disengaging position when the other shaft is moved to gear engaging position.

8. A construction as defined in claim 7, in which said gear means on said first shaft comprises two separate gears, one for driving said speed scale ring and the other for driving said aperture scale ring.

9. A construction as defined in claim 7, in which said gear means on said first shaft comprises a single gear elongated in an axial direction to engage simultaneously with both said speed scale ring and said aperture scale ring.

(References on following page)

References Cited in the file of this patent

UNITED STATES PATENTS

| | | |
|---|---|---|
| 2,209,156 | Fischer | July 23, 1940 |
| 2,342,819 | Priesemann | Feb. 29, 1944 |
| 2,509,385 | Ziaylek | May 30, 1950 |
| 2,596,328 | Dorsey | May 13, 1952 |

FOREIGN PATENTS

| | | |
|---|---|---|
| 7,787 | Great Britain | 1914 |
| 666,365 | Germany | Oct. 18, 1938 |
| 1,028,877 | France | May 28, 1953 |